United States Patent [19]
Ulrich

[11] Patent Number: 4,596,466
[45] Date of Patent: Jun. 24, 1986

[54] METHOD FOR THE MEASUREMENT OF LENGTHS AND DISPLACEMENTS

[76] Inventor: Reinhard Ulrich, Alte Rennbahn 2, D-2110 Buchholz, Fed. Rep. of Germany

[21] Appl. No.: 323,482

[22] Filed: Nov. 20, 1981

[30] Foreign Application Priority Data

Nov. 24, 1980 [DE] Fed. Rep. of Germany ....... 3044183

[51] Int. Cl.$^4$ .............................................. G01B 9/02
[52] U.S. Cl. .................................. 356/345; 356/346; 356/358
[58] Field of Search ................. 356/345, 346, 357, 358

[56] References Cited

U.S. PATENT DOCUMENTS

| | | | |
|---|---|---|---|
| 4,153,370 | 5/1979 | Corey, III | 356/358 |
| 4,329,058 | 5/1982 | James et al. | 356/357 X |
| 4,355,898 | 10/1982 | Dakin | 356/346 |

FOREIGN PATENT DOCUMENTS 1373645  11/1974  United Kingdom ................ 356/358

OTHER PUBLICATIONS

Patten, "Michelson Interferometer as a Remote Gauge", *Applied Optics*, vol. 10, No. 12, pp. 2717-2721, Dec. 1971.
Flournoy et al., "White-Light Interferometric Thickness Gauge," *Applied Optics*, vol. 11, No. 9, pp. 1907-1915, Sep. 1972.
Goedgebuer et al., "Construction of an Interferometric Gauge System for Thickness Measurement in White Light", *Optics and Laser Tech.*, vol. 10, No. 4, pp. 193-196, 8/78.
Ramsay et al., "Communication Using Frequency-Modulated Light", *Proc. I.R.E. Australia*, pp. 673-677, Sep. 1963.
Kapany, "Fiber Optics", *Academic Press*, NY, pp. 17, 49-51, 1967.
Personick, "Time Dispersion in Dielectric Waveguides", *Bell Sys. Tech. J.*, vol. 50, No. 3, pp. 843-859, Mar. 1971.
Crosiguai et al., "Smoothing of the Mode-Power Fluctuations ...", *Optics Communications*, vol. 18, No. 4, pp. 551-552, Sep. 1976.

*Primary Examiner*—Davis L. Willis
*Assistant Examiner*—Matthew W. Koren
*Attorney, Agent, or Firm*—Antonelli, Terry & Wands

[57] ABSTRACT

A method and apparatus are provided for the remote measurement of a quantity of length or displacement, employing fiber-optical signal transmission between two or more interferometers, one of which acts as an optical transducer while the other acts as the receiver for the information about the quantity to be measured. A major advantage of the arrangement is that it operates with low-power, spatially incoherent broad-bandwidth light. More particularly, the quantity to be measured is represented by the path difference of two partial light beams passing through the arms of one interferometer, thus encoding the information about the path difference onto the light-flux resulting from the recombination of the two partial light beams. The transmitting interferometer is connected by an optical fiber with a receiving interferometer, where the information is recovered by evaluating the autocorrelation signal of the transmitted light. This use of optical fiber for connecting the two interferometers is another important feature which permits long distances to exist between the interferometers so that the measurement can be made of a quantity which is quite far away from the desired point of evaluation.

9 Claims, 10 Drawing Figures

METHOD FOR THE MEASUREMENT OF LENGTHS AND DISPLACEMENTS

This invention relates to a method and to devices for the remote measurement of lengths and displacements, employing fiber-optical signal transmission between two or more interferometers, one of which is acting as an optical transducer and another one as the receiver for the information about the length to be measured, and operating with low-power, spatially incoherent, broad-bandwidth light. More particularly, the length to be measured is represented by the path difference of two partial light beams passing through the arms of one interferometer, thus encoding the information about the path difference onto the light-flux resulting from the recombination of the two partial light beams. The transmitting interferometer is connected by an optical fiber with a receiving interferometer, where the information is recovered by evaluating the autocorrelation signal of the transmitted light.

The remote measurement of lengths or displacements is a problem in many technical and scientific fields, and particularly in automatic process control systems in industrial plants. The length to be measured may be of interest in itself, or it may represent any other physical quantity of interest characteristic for the operation of the plant. Usually, a high reliability of the measurement is absolutely essential, and therefore it is necessary to provide unperturbed, reliable signal transmission even in adverse environments from the transducers in the plant to the receivers in a central control station.

For this transmission, optical fibers are particularly well suited because they are highly immune to electromagnetic interferences, elevated temperatures, attack by corrosive chemicals, and to ionizing or nuclear radiation, and because they can operate at low optical power levels so that they can also be used in potentially explosive environments. Fiber-optic signal transmission requires, of course, a transducer to directly or indirectly convert the unknown physical quantity into a suitable light signal, which can be guided along the fiber and which can then be interpreted by an optical receiver.

Presently, such measuring systems can be constructed by employing commercially available transducers having an electrical output, and by combining them with electronic-to-fiber-optic signal converters which are now commercially available, too. Such a combined system for the remote measurement of, e.g. a length, could consist of: (1) a variable electrical potentiometer controlled by the length to be measured; (2) a voltage-to-frequency converter translating the output voltage of the potentiometer into a stream of electrical pulses of characteristic frequency; (3) a light-emitting diode driven by those pulses and sending its light into the fiber; and (4) a receiving photodiode with calibrated electronic circuitry to interpret the pulse frequency as a length and indicate it in a suitable form.

Because the described, presently possible fiber-optic measuring systems depend on electronic circuits and light-emitters at the location of the transducer, they cannot (or not fully) provide all the advantages of fiber-optic transmission mentioned earlier. Most electronic components are susceptible to failure from the perturbations listed, or they have to be well shielded to reduce explosion hazard.

It is therefore an object of the invention to provide a system for the remote measurement of lengths and displacements using fiber-optic transmission of the length information, avoiding all electrical components at the location of the transducer, requiring no electromagnetic shielding or explosion-shielding of the transducer, and producing an optical signal which can be transmitted along the fiber and from which the unknown length can simply and reliably be recovered by a receiver at the output end of the fiber. This object of measuring lengths and displacements is understood here to include also the remote measurement of other physical quantities which may be characteristic for the operation of an industrial plant, e.g. temperature or pressure, which may simply be converted into a corresponding mechanical displacement, e.g. by thermal expansion or elastic deformation of a suitable body.

This object has been achieved, in accordance with the invention, by providing two interferometers, interconnected with an optical fiber and arranged so that the light from a broad-bandwidth optical source passes through both interferometers successively and then falls onto a detector.

This optical system operates on the following principle, which is fundamental to the claimed methods and devices. One of the two interferometers is the transducing interferometer, located where the quantity of interest is to be measured. The path difference of this interferometer is made to vary in proportion to the quantity to be measured. That path difference is determined then from a systematic temporal or spatial variation of the path difference in the other interferometer, acting as the receiving interferometer and located possibly far from the transducing interferometer. When both path differences are equal, the interference signal at the detector assumes an extreme value. By detecting this situation, the unknown path difference in the transducing interferometer, and thus the corresponding value of the quantity to be measured, are transmitted to the receiving interferometer in purely optical form. At the receiving interferometer, the path difference existing in the situation of an extreme interference signal can be evaluated, after suitable calibration, and indicated directly in units of the quantity to be measured.

The advantages offered by the method according to the present invention, as compared to other possible methods of remote measurement, are at least the following:

1. The output light-flux of the transducing interferometer is produced without employing at the location of the measurement any electronic or opto-electronic components whose operation might be adversely affected by the ambient conditions.

2. The method according to the invention is insensitive to slow temporal variations of the transmitted optical power, provided the characteristic time constant of those variations is long compared to the time interval required to identify the extreme values of the interference. More precisely, variations of the power or spectrum of the transmitted light will change the magnitude of the maxima or minima of the interference signal and may modify the shape of those peaks when recorded vs. the path difference, but they do not affect their absolute positions, expressed as path difference.

3. The result of a remote measurement according to the present invention is independent of the properties of the optical fiber used for the interconnection of source, interferometers, and detectors, provided only that enough optical power is reaching the detector to permit evaluation of the position of the maxima or minima of the interference signal. The measurement is not affected by the dispersion of the optical fiber, by mode coupling, or by attenuation in the fiber or at fiber splices or connectors. All these effects modify both partial light beams superimposed in the interferometers in exactly the same way. Therefore, the optical fiber employed for the interconnection of source, interferometers and detectors may be a cheap multimode step-index fiber.

4. As the method according to the present invention does not operate with a coherent primary light-flux, the light source employed may be a simple incandescent lamp or a broad-bandwidth light-emitting diode. These sources are known to be highly reliable, offering a constant optical power and long life expectancy. Their output power coupled into an optical fiber is so small that these fibers may be used without special protective measures even in potentially explosive environments.

In earlier experiments for the purely optical transmission of displacements (see for example: C. Deslisle and P. Cielo, Canad. Journal of Physics, Vol. 53, 1975, p. 1047–1053), only very small displacements have been transmitted, typically much smaller than the average wavelength of the light source. In those experiments, fixed path differences of up to 300 m have been employed for the purpose on encoding, so that in a number of series-connected transmitting interferometers with distinctly different path-differences each one could be identified by the receiving interferometer (C. Delisle et M. Brochu, Canad. Journ. of Physics 50, (1972, p. 1993 - ).

For the transmission of lengths and displacements in the mentioned applications like process control in industrial plants, the range of lengths to be measured is typically of the order of 0.1 cm to 10 cm or more. Such wide ranges violate the conditions stated for the quoted earlier experiments. Another crucial disadvantage of those earlier experimental arrangements, essentially precluding their practical use in an industrial environment, is that the two interferometers had been optically connected by a freely propagating, highly collimated light-beam. Such a beam would need careful alignment, would have a large cross-section, would not be flexible, and it might be blocked by clouds of dust or vapor. For these reasons, such a beam cannot be made very long.

It is another object of the invention, therefore, to provide an optical transmission of lengths and displacements which are substantially larger than the average wavelength of visible light, i.e. to extend the range of remotely measurable lengths and displacements to at least the order of centimeters. Moreover, it is an object of the invention to provide such transmission of length information by means of optical fiber, over distances between transducer and receiver extending from e.g. 1 m up to many kilometers.

These objects have been achieved in accordance with the invention by the arrangement of two interferometers and optical fibers for their interconnection and connection to a broad-band source and a detector, and by operating this arrangement so that the path difference in the transducing interferometer is made proportional to the quantity to be measured and then systematically varying the path difference of the other interferometer until detection of the interference peak indicates equality of the two path differences.

Another object of the invention is to provide a highly accurate, and preferably digital, indication of the unknown length or displacement, i.e. of the result of the remote measurement. This object has been achieved in accordance with the invention, by scanning the path difference of the receiving interferometer at constant absolute speed, with alternating directions, thus converting the spatial distance between the two conditions of equal path differences into a temporal distance, i.e. a time interval, which is then measured electronically with high precision and in digital form.

A further object of the invention is to provide also a method which permits determining physical quantities of interest in industrial process control with the minimum possible time delay. The fiber-optic arrangement described above, employing the method of systematic temporal variation of the path difference in the receiving interferometer has an intrinsic delay time approximately equal to the scanning period. According to this aspect of the invention, the object of fast measurement is achieved by making the receiving interferometer part of a control loop which automatically keeps the receiving path difference equal to that in the transducing interferometer.

In accordance with two other preferred embodiments of the invention, the transducing interferometer, located remotely near the point where the quantity of interest is to be measured, may be connected by only a single fiber with the rest of the measuring system, i.e. the light source, the receiving interferometer, and the detector in the evaluation unit. These arrangements require a beamsplitter or branching device to separate the input and output light fluxes of the transducing interferometer. The advantage of these embodiments is that they require approximately only half the length of optical fiber as compared to other embodiments of the invention.

It is another object of the invention to provide the advantages of remote fiber-optic measurement in systems in which the result of one measurement must be evaluated independently at two or more receiving locations. This possibility permits increasing the reliability of the system by using the redundant information. An embodiment of the invention offering this advantage uses an N-fold branching device or beam splitter, feeding a corresponding number of receiving interferometers and evaluation units.

In other situations it may be found advantageous to operate a number of transducing interferometers in connection with a single receiving interferometer, thus saving on the total number of interferometers required and reducing the price.

A further saving on equipment is possible if the N channels of information in the described system are not evaluated in parallel, i.e. nearly simultaneously, but sequentially instead. The required multiplexer can save N-1 of the evaluation units if there is sufficient time available between two successive measurements of any one of the quantities of interest.

In accordance with still another embodiment of the invention, the systematic variation of the path difference $x_f$ over the total required range in the receiving interferometer is subdivided into N smaller ranges $\Delta x_f$. This modification has the advantages of reducing the required scan time and the required mechanical scan range by a factor N, thus improving the speed of measurement and simplifying the construction of the scan mechanism.

A preferred embodiment of the interferometers required for optically transducing and receiving the length information has an essentially linear arrangement of optical components, thus permitting particularly simple and compact constructions.

An alternative design of the transducing and receiving interferometer is possible in the form of the Fabry-Perot interferometer. This embodiment also has the advantage of a particularly simple construction.

These and other objects, features and advantages of the present invention can be seen by reference to the drawings which illustrate, for purpose of example only, several embodiments of the present invention, wherein.

Figure 1:
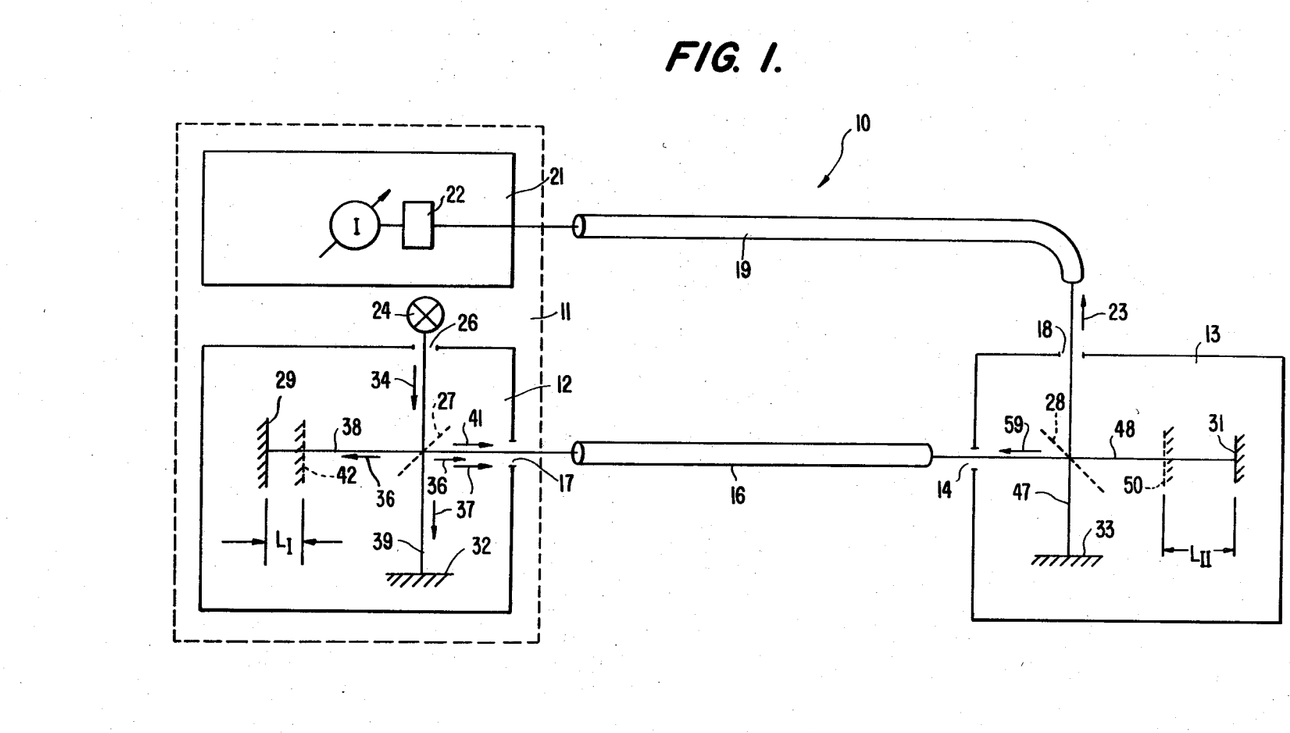
FIG. 1 shows a first embodiment of a fiber-optic measurement system comprising two two-beam interferometers connected in series by an optical fiber and a detector unit, which is also connected by an optical fiber to the output of one of the interferometers.

The fiber-optic system 10, shown in FIG. 1, is intended for the remote measurement of small lengths and displacements, ranging typically from 0-10 mm, and also for the measurement of other physical quantities, e.g. pressure and temperature, which may be converted to a displacement in the specified range. The term "remote" means that the evaluation of the optical signal, containing the information about the unknown length, is performed in an evaluating system, denoted 11, which may be far (1 m to 1 km or more) from the location where the unknown length or displacement actually exists.

The system 10, whose components should be noted in detail, comprises a first two-beam interferometer 12 as part of the evaluating system 11, and a second two-beam interferometer 13 located near the point of measurement. The input 14 of interferometer 13 is optically coupled by an optical fiber to the output of the first interferometer 12. The output 18 of the second interferometer 13 is further connected by a second optical fiber 19 with a unit 21 provided as part of the evaluating system 11, which produces a signal I proportional to the power of the output light-flux of the second interferometer. This output flux is represented by the arrow 23 and falls onto a detector 22.

Hence, the two interferometers 12 and 13 are connected optically in series between a light source 24 and the evaluation unit 21. The light source 24 forms also a part of the evaluating system 11 and emits a white or spectrally broad primary light-flux which is coupled into the input of the first interferometer.

In the following, the term "white" primary light-flux shall denote a light flux with a continuous or discrete spectrum of width $\Delta\lambda$ which is approximately comparable to an average wavelength of the source. This spectrum may extend over visible and infrared wavelengths.

In the embodiment shown for illustration in FIG. 1, the two interferometers 12 and 13 are indicated in the form of the well-known Michelson-type interferometer, each comprising a beamsplitter 27 and 28, a movable mirror 29 and 31, and a fixed mirror 32 and 33, respectively.

For an explanation of the operation of the interferometers 12 and 13 according to the method of the invention, first the interferometer 12 is considered. The white primary light-flux, represented by the arrow 34, enters the interferometer and is split by the beamsplitter 27 into two partial light beams of approximately equal intensities, represented by the arrows 36 and 37. These light beams are reflected by the mirrors 29 and 32, respectively. The light path extending from the beamsplitter 27 to the movable mirror 29 and back to the beamsplitter 27 is called one arm of the interferometer 12. Correspondingly, its other arm extends from the beamsplitter 27 to the fixed mirror 32 and back to the beamsplitter. Returning to the beamsplitter, the reflected partial light beams 36 and 37 are superimposed on each other, producing a first combined light-flux, which is represented by arrow 41 and is guided by the first optical fiber 16 to the second interferometer 13. In general, the two arms 38 and 39 of the interterferometer 12 have different lengths. Therefore, the transit times of the partial light beams 36 and 37 are different, too, and they become superimposed with a time difference $T_I$ at the output 17. This difference is $$T_I = x_I/c = 2L_I/c, \qquad [1]$$

where $x_I$ is the path difference between the two arms 38 and 39 of the interferometer, and c is the velocity of light in vacuum. The path difference $x_I$ is twice the distance $L_I$ between the movable reflector 29 and the mirror image 42 of the fixed reflector 32, produced by the semitransparent beamsplitter 27.

Figure 2:
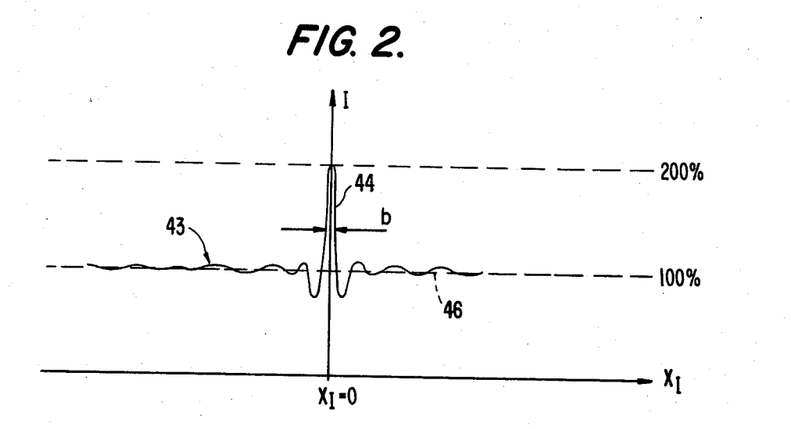
FIG. 2 shows an interferogram for explaining the operation of the interferometers employed in the arrangement of FIG. 1.

The curve 43 of FIG. 2 shows how the intensity of the output beam 41 depends on the path difference $x_I$ in the first interferometer 12. This curve is called an interferogram. It has a well-pronounced central maximum 44 at $x_I = 0$ where the path difference vanishes so that all spectral components of the primary light-flux interfere constructively. Next to that central maximum there are on either side several smaller side-maxima and minima.

The width b of the central maximum 44 is approximately proportional to the inverse of the spectral bandwidth of the light passing through the interferometer. If the path difference $x_I$ is made much larger than the width b of the central maximum 44, the two partial light beams no longer interfere. Frequently, this situation is also characterized by stating that the interference ceases when the delay $T_I$ between the beams is much longer than the coherence time of the primary light-flux 34 and of the two partial beams 36 and 37. Considering for that situation the the signal level 46 of the interferogram 43 as a 100% reference value, the height of the central interference maximum near $x_I=0$ is approximately 200%.

For further explanation of the method of measurement and of the devices according to the invention, the case is considered next where the light flux 17 resulting at the output of interferometer 12 passes through the second interferometer 13 onto the detector 22 in the evaluation unit 21. This light-flux is split again into two partial light-beams which pass through the arms 47 and 48 of the interferometer 13. Their path difference here, $x_{II}=2L_{II}$, where $L_{II}$ is defined in analogy to $L_I$. This path difference $x_{II}$ represents the quantity to be measured. For the purpose of this discussion it is assumed then that $x_{II}$ has some fixed, large value, $x_{II} >> b$. The delay time $T_{II}$ which is characteristic for the path difference in interferometer 13 is $$T_{II}=x_{II}/c=2L_{II}/c. \qquad [2]$$

Both partial light, beams 36 and 37, that had been produced by the beamsplitter 27 in interferometer 12 and that represent the output light-flux 17, are split again in the interferometer 13 into two partial light beams whose relative delay difference is given by Eq. [2] above. Therefore, the output light-flux 23 of the second interferometer 13 consists generally of a total of four partial light beams, having approximately equal amplitudes, and arriving at the detector 22 at different times. Referring to that partial beam which reaches the detector first, the other three beams are delayed by the time intervals $T_I$, $T_{II}$, and $(T_I+T_{II})$. Because of these differences, the four beams will in general not interfere. An interference will be observed, however, if at least two of these beams arrive simultaneously at the detector. As $x_{II} \neq 0$ had been assumed, an interference is possible if either of the following conditions is satisfied.

(a) $T_I=0$ (b) $|T_I|=|T_{II}|$

When conditon (a) is satisfied, there are two interferences of two beams each. This case will be called here "main" interference. It corresponds closely to the central maximum 44 of FIG. 2, reaching a relative intensity of 200%. When condition (b) is satisfied, an interference occurs between only two of the four partial light beams, whereas the remaining two beams have different delay times. This case will be called here "secondary" interference. In this case, the intensity falling on the detector 22 reaches a secondary maximum of height 150% relative to the mean signal level, i.e. in the absence of interferences.

Figure 3:
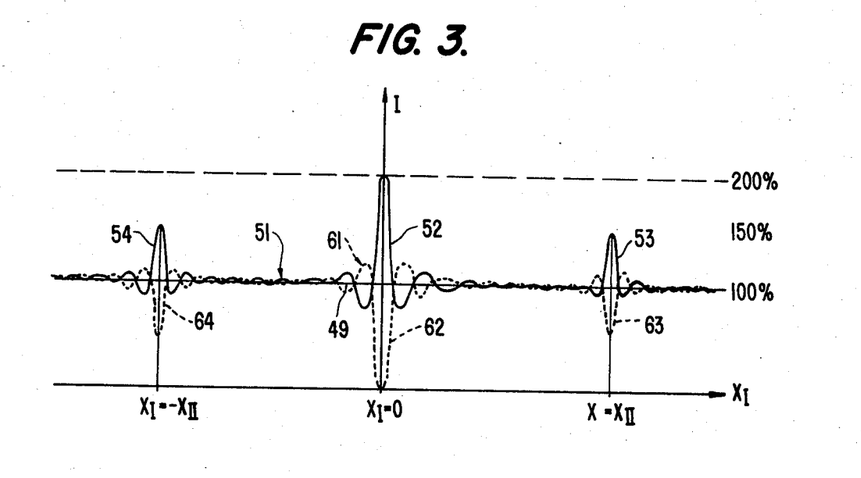
FIG. 3 shows the typical dependence of the detector signal on the path difference of the first interferometer in the arrangement of FIG. 1.

In FIG. 3 an interferogram 51 is shown for the entire system 10. This curve represents the typical dependence of the detector output signal when the path difference $x_I$ in the first interferometer is varied systematically. The main interference 52, corresponding to the central maximum 44 of FIG. 2, occurs only once, at $x_I=0$, when condition (a) is satisfied. The secondary interference 53 and 54 occurs twice, however, because condition (b) is satisfied when $x_I=x_{II}$ and also when $x_I=-x_{II}$. For the occurence of these secondary interferences it is only essential that the absolute delay times $|T_I|$ and $|T_{II}|$ are equal, and it does not matter whether the delay $T_I$ is produced by making the arm of the interferometer containing reflector 29 longer or shorter than the other arm.

From FIG. 3 it is recognized how it is possible according to the invention to measure a length or displacement, which exists at the location of interferometer 13, remotely from the evaluating unit 11. For the purpose of explanation it is assumed here that each value of the path difference $x_{II}$ between the arms 48 and 49 of the second interferometer 13 is directly related to a particular value of the quantity to be measured. To determine this value, the path difference $x_I$ in the first interferometer is varied systematically until the three interference maxima 52, 53, and 54 of FIG. 3 are identified. The distances of the secondary maxima 53 and 54 from the main maximum 52 are directly equal to the path difference $x_{II}$ existing in the interferometer 13. This value of $x_{II}$ is stored as a reference value for any changes of $x_{II}$ which may occur due to a change of the quantity to be measured. If such a change occurs, it can be measured by again varying systematically the path difference $x_I$ in the evaluating system 11 and identifying the new positions of the maxima 52, 53, and 54. The new distance from either secondary maximum 53 and 54 to the main maximum represents the new value of $x_{II}$. The difference between this new value and the old, previously stored reference value represents the change of $x_{II}$. It is equal to twice the displacement of the movable reflector 31 which is caused by the change of the quantity to be measured. According to this explanation, the interferometer 13 may be called the transducing interferometer, and interferometer 12 the receiving one.

In employing this method, an ambiguity may result if the movement of the reflector 31 passes through the position $x_{II}=0$. This ambiguity can be avoided simply by mechanically restricting the range of travel of that reflector.

Figure 4:
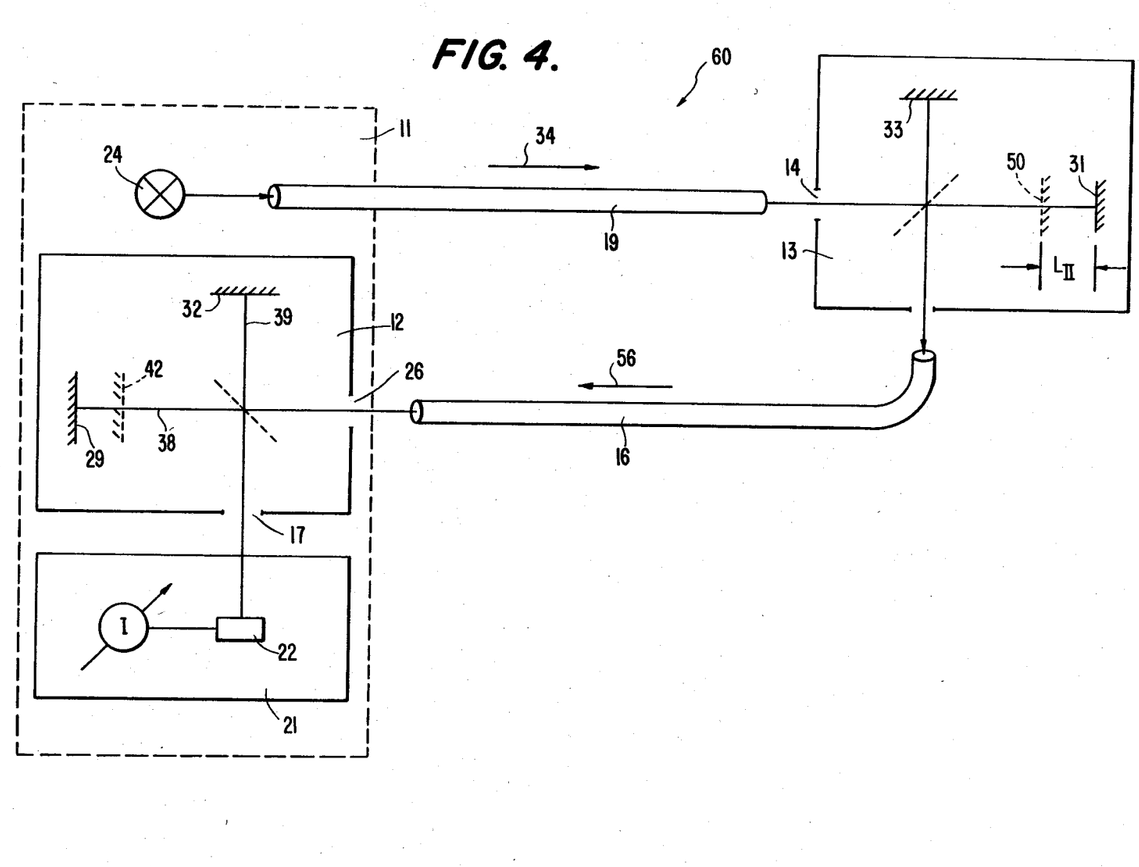
FIG. 4 shows an alternative embodiment of a fiber-optic measurement system, in which the two interferometers are arranged in essentially reversed order.

Another embodiment 60 of the invention is shown in FIG. 4. Its operation is completely analogous to that of the embodiment 10 of FIG. 1. Therefore, corresponding elements of FIGS. 4 and 1 are labeled by identical numbers. This measuring system 60 differs from that of FIG. 1 mainly by an interchanged arrangement of the light-source 24 and the evaluation unit 21. According to the invention, therefore, in the arrangement 60 the primary light-flux 34 is coupled from the light-source 24 first into a fiber 19 and is guided to the input of the transducing interferometer 13, whose path difference $x_{II}$ is directly related to the quantity to be measured. The output light-flux of this interferometer is represented by the arrow 56. This light-flux results from the superposition of two partial light-beams which were produced by splitting the primary light-flux 34 and which are delayed with a relative time difference $T_{II}$ proportional to the quantity to be measured in interferometer 13. The output light-flux 56 is guided then by an optical fiber 16 to the receiving interferometer 12. Here, the path difference $x_I$ of the arms 38 and 39 of the interfrometer is varied systematically, to identify the maxima 52, 53, and 54 of the characteristic correlation function 51, as has been previously shown in FIG. 3. This function is recorded and evaluated in the evaluation unit 21, which comprises the detector 22 and receives the light from the output 17 of the receiving interferometer.

In either arrangement 10 and 60, shown in FIGS. 1 and 4, two optical fibers 16 and 19 were required to guide the light-flux from the evaluating system 11 to the transducing interferometer 13 and back again to the evaluating system 11. This purpose is served by only one single optical fiber in the embodiments 65 shown in FIG. 5 and 66 shown in FIG. 6.

Figure 5:
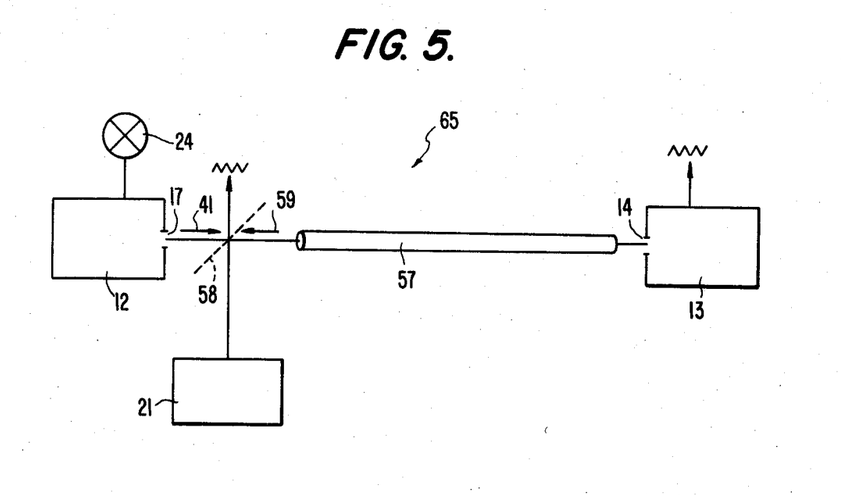
FIGS. 5 and 6 show arrangements corresponding closely to those of FIGS. 1 and 4, respectively, but employing only a single optical fiber for the optical connection between the interferometers and a beamsplitter, representing a branching device for simultaneous output coupling from the interferometers to the detector unit, or input coupling from the light-source into the interferometers, respectively.

The construction and principle of operation of the embodiment 65, shown in FIG. 5, correspond largely to those of the embodiment 10 in FIG. 1. However, a difference is the insertion of an additional beamsplitter 58 or of an equivalent fiber-optical branching device between the output 17 of the first interferometer 12 and the near end of the optical fiber 57. For the purpose of illustration, this branching device is represented in FIG. 5 by a semitransparent plane mirror, inserted at a 45° angle. This device serves to separate a fraction of the light-flux 59, which returns in the fiber from the transducing interferometer 13, from the path of the input light-flux 41 going to that interferometer. This returning light flux results from the superposition of those two partial light-beams in the interferometer 13 which are reflected back to the input of the interferometer. Therefore, the intensity of the returning light-flux 59 is complementary to the output light-flux 23 of the interferometer 13 in FIG. 1. The branching device 58 directs part of the returning light-flux into the evaluation unit 21 in FIG. 5. While the intensity of the light-flux 23 as a function of path difference $x_I$ was represented by the full-line interferogram of FIG. 3, the complementary flux 59, as measured by the evaluation unit 21, has an intensity-versus-$x_I$ dependence shown by the dashed curve 61 in FIG. 3. Corresponding to the main maximum 52, there exists a main minimum in curve 61. There, at $x_I=0$, the intensity of the returning light-flux 59 nearly vanishes. Corresponding to the two secondary maxima 53 and 54, there are two secondary minima in curve 61, where the intensity of the flux 59 drops to approximately 50% of its mean signal level in the absence of interferences.

Figure 6:
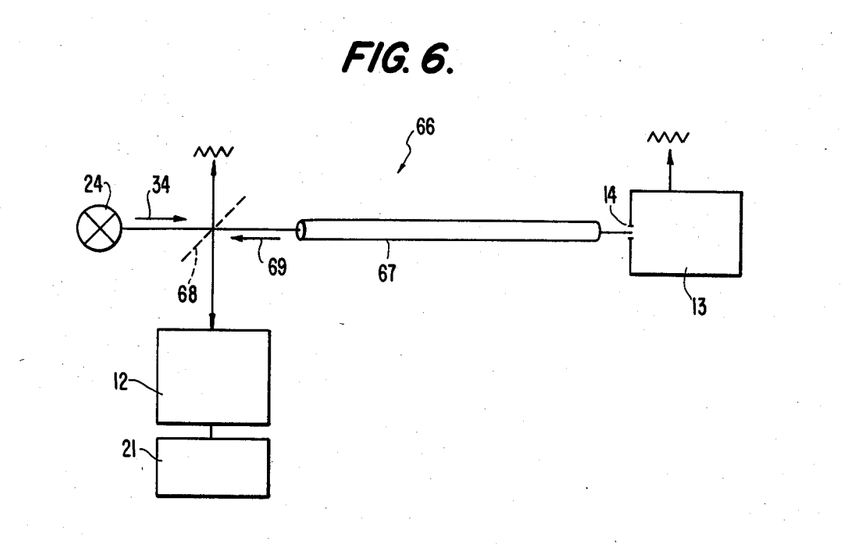

The same curve 61 is also characteristic for the embodiment 66 of the invention, shown in FIG. 6. The principle and operation of this arrangement correspond largely to those of the embodiment 60 of FIG. 4. The arrangement of components in FIG. 6 differs from that of FIG. 4 by the insertion of an additional beam splitter 68 or fiber-optic branching device between the light-source 24 and the near end of the sole optical fiber 67. Without restricting generality, this branching device is again represented by a semitransparent mirror inserted at 45° angle. It branches off a fraction of the light-flux 69 returning from the transducing interferometer 13, directing that fraction into the receiving interferometer 12. The functional difference of this arrangement 66 as compared to that of FIG. 4 is that the receiving interferometer 12 accepts at its input those parts of the superimposed partial light beams of the transducing interferometer 13 which are reflected back to its input 14.

All embodiments of the invention explained with the help of FIGS. 1–6 may be modified so that the optical information on a length or displacement, obtained in one transducing interferometer, can be evaluated in a plurality of receiving interferometers which are connected by a multiple-branching unit and a corresponding number of optical fibers with the transducing interferometer. The receiving interferometers may be arranged at various locations, remote from each other and from the point of measurement, or they may all be located in a single receiving station.

Figure 7:
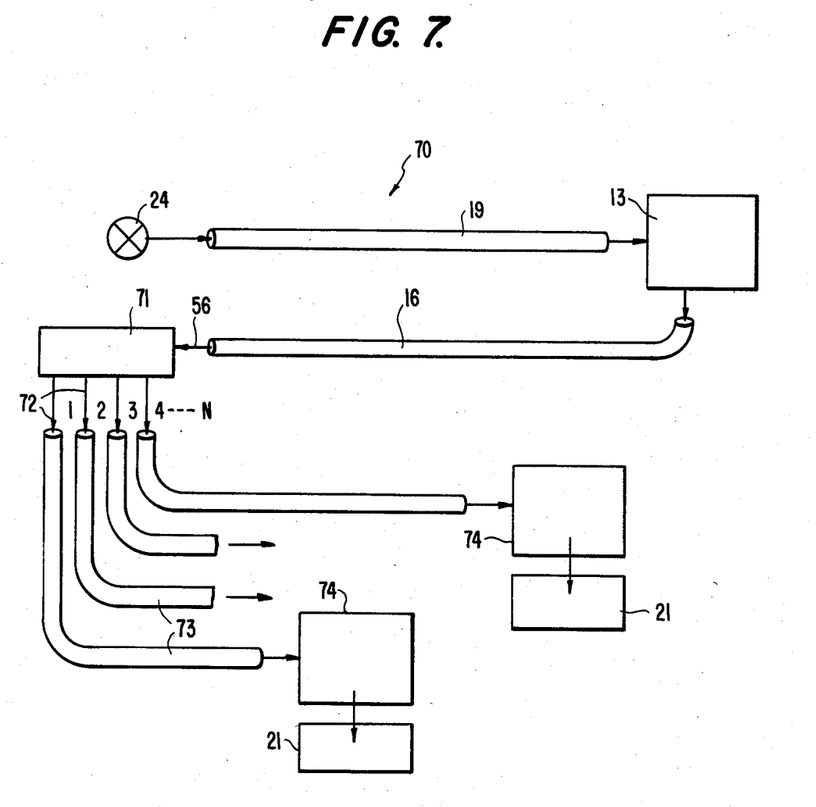
FIG. 7 shows an arrangement corresponding to that of FIG. 4, comprising a branching device with several outputs, each of which is connected to a separate interferometer and detector unit, capable of receiving and evaluating the length information.

A suitable embodiment 70 of a multiple receiving interferometer arrangement is shown schematically in FIG. 7. Its basic arrangement corresponds to that of FIG. 4. The optical fiber 16 guides the output light-flux 56 of the transducing interferometer 13 to the multiple branching unit 71. It divides the light-flux into a number N of partial light-fluxes 72 which have approximately equal intensities and each of which is guided by a separate optical fiber to a separate receiving interferometer 74 with associated evaluation unit 21. In this arrangement, each receiving interferometer 74 can evaluate independently the information on the length or displacement contained in the light-fluxes 56 and 72.

It is understood that the number N of receiving interferometers, which can be connected simultaneously to a single transducing interferometer, is limited by the condition that each receiving interferometer must get a light-flux 72 of sufficient intensity to permit an accurate identification of the positions of the interference maxima 52, 53, and 54.

In a preferred embodiment of the invention, representing a modification of the arrangement 70, the N receiving interferometers are devised so that their individual path differences $x_{I1} \ldots x_{IN}$ are staggered evenly by discrete intervals $\Delta x_I$. The width $\Delta x_I$ of that interval is chosen to be $1/N$ of the total range of variation of $x_I$ which is necessary for the identification of the unknown path difference $x_{II}$ from the interferogram 51. Moreover, the N receiving interferometers are functionally linked so that the systematic variation of their staggered path differences occurs simultaneously and jointly, each one through an interval of the width $\Delta x_I$ defined above. As a consequence, the interferogram 51 is subdivided into N successive intervals or "channels", which are interrogated in parallel by the described simultaneous variations of their path differences. This scheme provides coarse digital information on the quantity to be measured simply from the numbers of those channels in which the receiving interferometers and associated evaluation units identify the interference maxima 52, 53, and 54. Fine information about the exact positions of those maxima within their respective intervals $\Delta x$ is obtained from the mentioned systematic and continuous variation of the path differences.

Provided that the output light-flux 56 of the transducing interferometer 13 is sufficiently powerful, an important advantage of such an arrangement 70 with a fine subdivision of the total scan range of $x_I$ is that the mentioned simultaneous variation of $x_I$ through the range $\Delta x_I$ can be achieved with piezo-ceramic elements. Such a driving method for the movable mirrors of the interferometers 12 avoids the need for high-precision bearings which would otherwise be required for those mirrors.

In another preferred embodiment of the invention, also designed similar to the embodiment 60 in FIG. 4, a plurality of combinations of source 24 and transducing interferometer 13 is provided. Their output light-fluxes 56 are guided by a corresponding number of optical fibers 16 to the input ports of a multiple beam-combining unit, in which these light-fluxes are recombined and then fed into the input of one single receiving interferometer. In such an arrangement for the measurement of a number of lengths or displacements there exists, of course, the problem of uniquely assigning the various secondary interference maxima identified in the receiving interferometer 12 and associated evaluation unit 21 to the various transducing interferometers 13. This problem may be solved by operating the arrangement with a time-multiplex control-system, e.g. by turning on only one of the light-sources 24 at a time, successively in a predetermined order, and by then evaluating the informations contained in the output light-fluxes of the individual transducing interferometers 13 in the same order.

Figure 8:
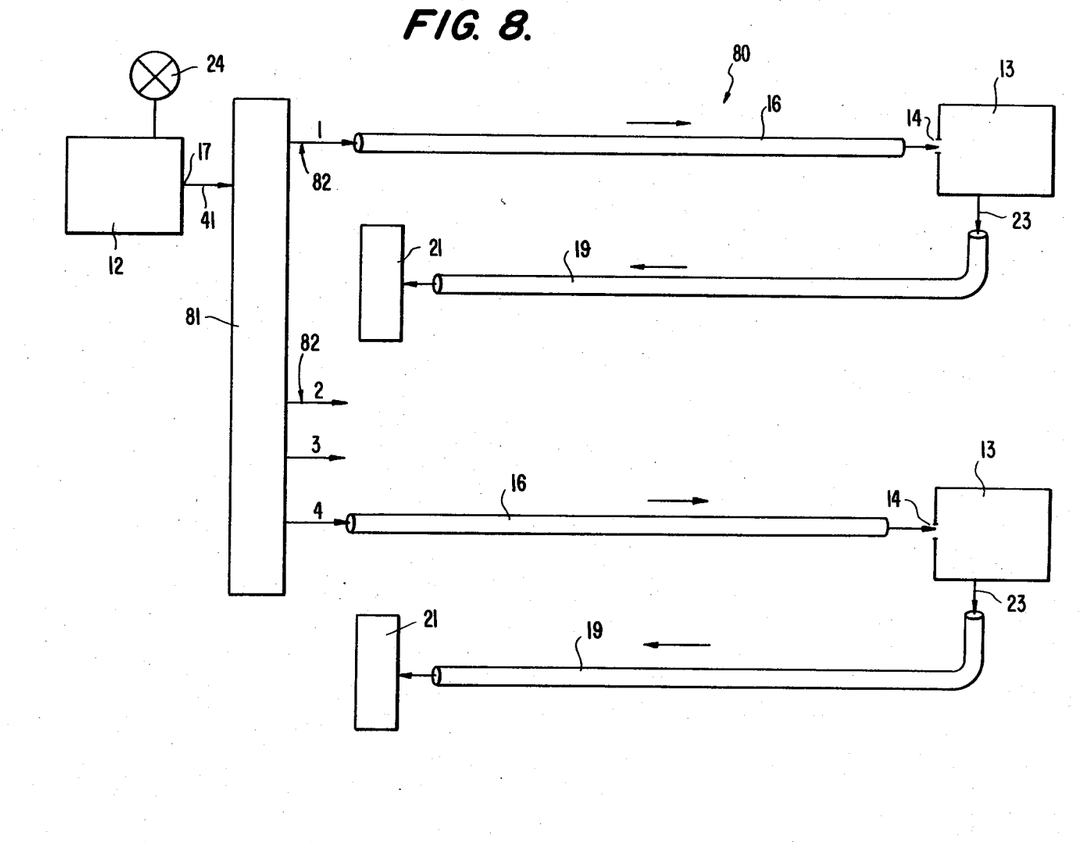
FIG. 8 shows an arrangement corresponding to that of FIG. 1, comprising a number of transducing interferometers for the measurement of N different lengths or displacements, operating all with one common receiving interferometer in a time-multiplexed system.

An alternative embodiment for the purpose just explained can also be realized in the arrangement of FIG. 8, devised corresponding to the embodiment 10 of FIG. 1.

The multiple measuring system 80 according to FIG. 8 comprises a single light source 24 and a single receiving interferometer 12. These components are centraly located. They are connected through a multiple branching unit 81, which splits the output light-flux 41 of the interferometer 12 into a number N of approximately equally intense light-fluxes, guided by optical fibers 16 to the input ports 14 of a corresponding number N of transducing interferometers 13. They permit the independent measurement of N quantities of interest, possibly at various different locations. The measurements are performed essentially in the same way as described in connection with the embodiment 10 of FIG. 1. The path difference $x_I$ in the receiving interferometer 12 is varied systematically for an identification of the interference maxima 52, 53, and 54. These maxima are detected, possibly recorded, and then evaluated for each transducing interferometer seperately in an associated evaluation unit 21, which accepts through a separate fiber 19 the output light-flux 23 from the corresponding interferometer 13. Because each evaluation unit 21 receives light through only one transducing interferometer 13, there exists no problem of assigning the maxima to the various transducers in this arrangement. The multiple branching unit 81 in this arrangement may be of the same construction as the unit 71, provided in the embodiment 70 of FIG. 7. A suitable type is the so-called fiberoptic star coupler.

One important advantage of the embodiment 80 of FIG. 8 is that only one receiving interferometer 12 is required. As the path difference of this interferometer must continuously be varied, it requires a more sophisticated and reliable construction than the simpler transducing interferometers 13. Therefore, the multiple use of interferometer 12 may reduce the overall costs of a multiple measuring system.

Figure 9:
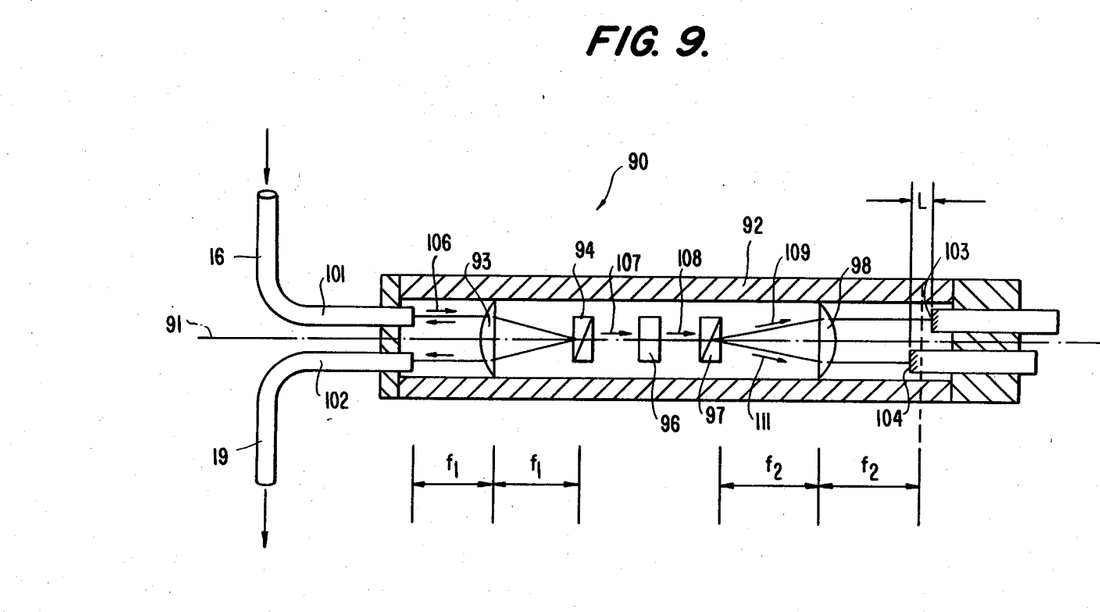
FIG. 9 shows schematically the embodiment of a Michelson-type interferometer, which is particularly suited for the fiber-optic measuring system according to the present invention.

A preferred embodiment 90 of one of the Michelson-type interferometers according to the invention is shown schematically in FIG. 9. This interferometer is particularly simple and compact, because its components are arranged symmetrically in pairs.

Along the central axis 91 of a long, cylindrical case 92 there are succesively arranged a first collimating lens 93, a first polarizing prism 94, a retardation plate 96, a second polarizing prism 97 and a second collimating lens 98. This unit is placed between input and output light-paths at one end, and the two reflectors of the interferometer at the opposite end of the case 92. The input/output light-paths are defined by the ends 101 and 102 of the optical fibers 16 and 19, arranged parallel to and diametrally opposite of the central axis 91. The reflectors 103 and 104 are similarly placed at symmetric positions with respect to the axis 91. One of them, e.g. the reflector 103 can be moved in the direction of the axis 91. According to its purpose of collimating the lens 93 is positioned so that the end faces of fibers 101 and 102 coincide with the front focal plane and the prism 94 with the rear focal plane of that lens. Correspondingly, lens 98 is placed so that prism 97 is in the front focal plane of that lens, and the mirrors 103 and 104 in or near the rear focal plane. The two polarizing prisms are of the well-known Wollaston type, splitting an incident light beam into two orthogonally polarized, oppositely deflected light beams. The mentioned arrangement of the end 101 of fiber 16, lens 93, and prism 94 has the effect that one polarization component, e.g. the vertical one, of the input light-flux represented by the arrow 106, is deflected so as to propagate as a collimated partial light-beam parallel to the axis 91 toward the retarder 96. This plate is a quarter-wave plate and is so oriented, that the light-beam 107 is converted into a left-circularly polarized beam 108. This beam is split then by the second Wollaston prism 97 into two diverging, linearly and mutually orthogonally polarized partial light beams 109 and 111, which are focussed onto the flat reflectors 103 and 104. Upon being reflected there, these partial light beams 109 and 111 retrace the same paths along which they came. The light travelling from the second prism 97 to the quarter-wave plate 96 is linearly polarized. According to the laws of polarization optics, however, the azimuth $\alpha$ of that linear polarization of the returning light is given by the relation $$\alpha = 2\pi L/\lambda;$$

where L is indicated in FIG. 9 and is equal to half the path difference of the light beams 109 and 111 returning from the reflectors 103 and 104, and $\lambda$ is the wavelength of the light. According to this azimuthal angle $\alpha$, the intensity of the light beams returning from the first prism 94 and coupled back into the fibers 16 and 19 varies as $\cos^2\alpha$ and $\sin^2\alpha$, respectively, in complete analogy to the operation of the Michelson interferometers shown in FIGS. 1 and 4.

A preferred method of determining the positions of the interference maxima 52, 53, and 54 in the previously explained measuring systems is to scan the path difference $x_I$ of the receiving interferometer linearly in time, i.e. with a velocity of constant absolute value, but alternating direction. The length or displacement to be measured, which is represented by the distance $x_{II}$ of the secondary interference maxima 53 and 54 from the main maximum 52, is converted by this mode of operation into time intervals of corresponding duration. Each time the path difference $x_I$ is swept through its range of variation, the detector 22 produces three successive signal pulses which correspond to the interference maxima 52, 53, and 54 of the interferogram 51 of FIG. 3. The time intervals between these pulses can be measured electronically with high precision by well-known methods. The results of such measurements of time intervals may then be displayed in suitable units of the quantity to be measured, or processed otherwise.

Another preferred method of evaluating the optical information about the length or displacement to be measured according to this invention is to incorporate the receiving into a control loop which maintains the receiver path difference $x_I$ always equal to the path difference $x_{II}$ in the transducing interferometer. For this purpose, one of the secondary maxima 53 or 54 of the interferogram must be "stabilized" by a servo mechanism controlling the path difference $x_I$. When the path difference $x_{II}$ in the transducing interferometer changes, in this mode of operation the path difference $x_I$ in the receiving interferometer follows automatically. Therefore, any change in the position of the movable mirror in the transducing interferometer is transmitted precisely into an identical positional change of the moving mirror in the receiving interferometer. Because the secondary maxima 53 and 54 of the interferogram have symmetrical shapes, it is a problem to produce an error signal whose sign indicates the direction of any positional difference $(x_I-x_{II})$ This problem can be solved by periodically dithering the path difference $x_I$ in the receiving interferometer 12, using e.g. a periodic oscillation of one of the mirrors 29 or 32 with a small amplitude and high frequency. As a consequence, an AC component results in the detector signal. The dithering is done with an amplitude which is smaller than the means wavelength of the spectral range of said primary light-flux, or which is smaller than half the width of the extreme peaks (52, 53, 54; 62, 63, 64) of said correlation function. Also, the duration of one period of said dither modulation is short compared to the time interval during which the length to be measured may change by an amount corresponding to the amplitude of said dither modulation. By phase-sensitive rectification of the AC component resulting from the dither, using the dither frequency as a reference, a signal is generated which essentially represents the derivative of the interferogram. That signal changes its polarity at $x_I=x_{II}$ and can, therefore, be used to control $x_I$ so as to follow the secondary maximum in the receiving interferometer 12.

In the preceding explanations of the systems 10, 60, 65, 70 and 80 for the remote optical measurement of lengths and displacements according to the present invention, the transducing and receiving interferometers 13, 12, and 90 had all been postulated to be two-beam interferometers. However, as mentioned already in the introduction, it is also possible to employ multi-beam interferometers, operating e.g. by the principle of the well-known Fabry-Perot interferometer. In that case, the path difference as used in the previous discussion is simply equal to twice the spacing of the reflecting surfaces of the Fabry-Perot interferometer.

The conditions (a) and (b) of interference, which had earlier been derived (in connection with FIG. 3) for simplicity only for the case of a two-beam interference, actually apply also to the case of multiple-beam interferences. The situation becomes particularly simple if the effective number F of interfering beams is only moderately large. For a Fabry-Perot interferometer this number F is the so-called finesse, $$F = \pi \sqrt{R}/(1 - R),$$

where R denotes the average reflectivity of the two Fabry-Perot mirrors. If this reflectivity is below the value $R=0.4$, the number of interfering beams, represented by F, does not exceed 3.4, and the resulting interferogram still resembles largely the type represented in FIG. 3.

Figure 10:
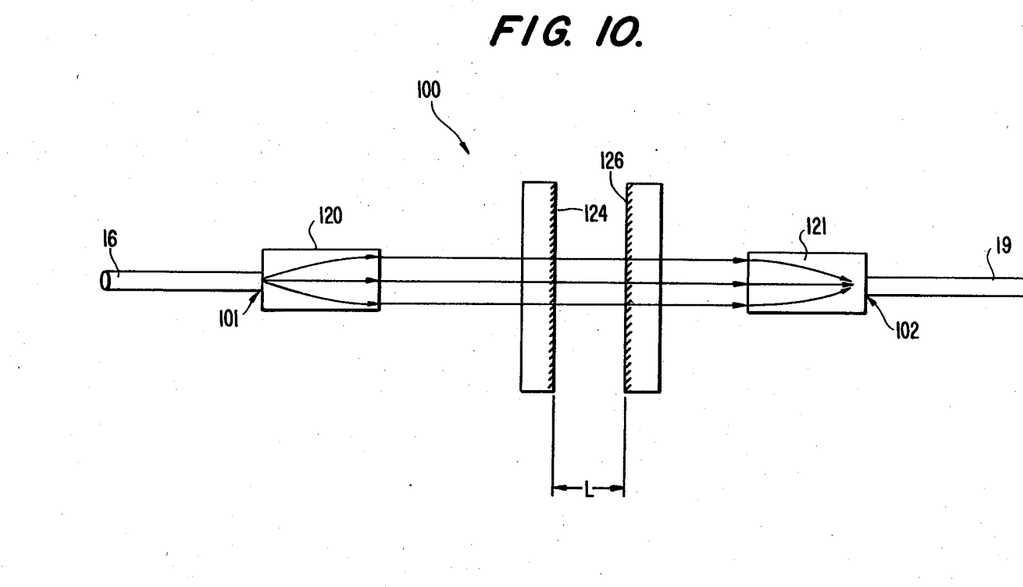
FIG. 10 shows schematically the construction of a Fabry-Perot-type interferometer which is alternatively suited for the fiber-optic measuring system according to the present invention.

An alternative embodiment of an interferometer that can be used according to this invention is the Fabry-Perot interferometer 100 shown in FIG. 10. This interferometer is of particularly simple and compact construction and can advantageously be used, therefore, as the transducing interferometer in various applications.

As shown in FIG. 10, two partially transparent mirrors 124 and 126 are arranged with parallel surfaces between the ends 101 and 102 of two optical fibers. A preferred embodiment comprises also two lenses 120 and 121 which are so deployed that the light emerging from the fiber end 101 is collimated by the lens 120 to form a parallel beam of light. It passes through the two reflectors 124 and 126 and is then focussed by the second lens 121 into the end 102 of the output optical fiber 19.

In FIG. 10 the lenses 120 and 121 are represented by selffocussing lenses, well-known in fiber optics. Alternatively, it is of course possible to use ordinary lenses.

At least one of the two mirrors 124 and 126 is arranged so that it can move in such a way that the distance L between the mirrors is equal to the length or displacement to be measured (apart perhaps from some constant offset), and that the parallelism of the two reflectors 124 and 126 is maintained during the movement.

The optical transmission of the interferometer 100 depends in a well-known manner periodically upon the distance L between the mirrors. If their reflectivity is not too high, for example $R \leq 0.4$, this dependence is very similar to that of a Michelson-type interferometer. Therefore, it is possible to employ such a Fabry-Perot interferometer 100 in all described arrangements instead of the transducing Michelson-interferometer.

If the reflectivity R is higher, further side maxima appear in the interferogram at positions $x_I = \pm h\, x_{II}$ with $h=2,3,4\ldots$, in addition to the secondary maxima 53 and 54 at $x_I = \pm x_{II}$ which were shown in FIG. 3. Ambiguities in the evaluation of such interferograms can be avoided by suitable electronic processing of the detector signals. The evaluation unit must determine the heights of the maxima in addition to their positions. For the evaluation it is necessary then to select only the two highest (secondary) maxima 53 and 54 next to the central peak 52.

If only very small lengths are to be measured (not exceeding 100 μm for example), the two lenses shown in FIG. 10 may be omitted. The thickness of the two mirrors 124 and 126 should then be chosen to be sufficiently small so as to reduce the loss of light caused by the divergence of the light emerging from the end of fiber 16.

What I claim is:

1. An apparatus for the measurement of a quantity of length or displacement comprising, in optical series connection between (a) a broadband light source which emits a primary flux of light within a spectral range whose width is comparable with a means wavelength of said source and (b) a detection and evaluation unit producing a signal proportional to the power of an incident light-flux, at least one transducing interferometer having two interferometer arms of different optical lengths, the path difference $x_{II}$ of the interferometer arms representing the quantity to be measured, and at least one receiving interferometer having two interferometer arms of different optical lengths and being provided with means for systematically varying the path difference $x_I$ of its interferometer arms within a range containing the values $-x_{II}$, 0, and $+x_{II}$, each value being correlated with an extreme value of the output signal of the serially connected interferometers, wherein said broadband primary light-flux is coupled into said receiving interferometer, wherein the output of the receiving interferometer is connected by a first optical fiber to the input of said transducing interferometer in which said length or displacement to be measured is transduced into a correlated path difference $x_{II}$ of the interferometer arms of the transducing interferometer, and further wherein the output of the transducing interferometer is connected to the detector and evaluating unit by a detector connection light path by which the output light-flux of the transducing interferometer is guided to an optical detector of the detection and the detection and evaluation unit.

2. An apparatus according to claim 1, wherein said detector connection light path comprises a second optical fiber coupled between the output of the transducing interferometer and the optical detector.

3. An apparatus according to claim 1, further comprising an optical branching device placed in the light path between the input of said transducing interferometer and the output of said receiving interferometer which is accepting at its input said broadband primary light-flux, said transducing interferometer including means for sending a return light-flux back through said first optical fiber so that said first optical fiber serves as a portion of said detector connection light path for the returning light-flux, and said branching device directing a fraction of said return light-flux received from said first optical fiber onto the detector.

4. An apparatus according to claim 1, wherein the output light-flux of said receiving interferometer is connected to the input part of an optical multiple branching device, said receiving interferometer accepting said white primary light-flux and serving for the detection of the extreme values of the interference signal, and wherein each output part of said multiple branching device is connected by an optical fiber to a separate transducing interferometer arranged to measure a separate physical quantity of interest, the output light-flux of each of said tranducing interferometers being connected by a separate optical fiber to a separate evaluation unit.

5. An apparatus according to claim 4, further comprising a time-multiplex unit which controls the sequential evaluation of said measured quantities.

6. An apparatus for the measurement of a quantity of length or displacement comprising, in optical series connection between (a) a broadband light source which emits a primary flux of light within a spectral range whose width is comparable with a mean wavelength of said light source and (b) a detection and evaluation unit producing a signal proportional to the power of an incident light-flux, at least one transducing interferometer having two arms or different optical lengths, the path difference $x_{II}$ of the interferometer arms representing the quantity to be measured, and at least one receiving interferometer having two interferometer arms of different optical lengths and being provided with means for systematically varying the path difference $x_I$ of its interferometer arms within a range containing the values $-x_{II}$, 0, and $+x_{II}$, each value being correlated with extreme values of the output signal of the serially connected interferometers, wherein said broadband primary light-flux is guided by an optical fiber to the input of said transducing interferometer whose path difference $x_{II}$ is proportional to the quantity to be measured, and further wherein the output light-flux from said transducing interferometer is coupled by an optical fiber to the input of the receiving interferometer whose output light-flux is sent furhter to an optical detector in said detection and evaluation unit, wherein the output light-flux of the tranducing interferometer is connected to the input part of a multiple optical branching device having a multiplicity of N output parts, each of which is connected to a separate receiving interferometer with an associated detection and evaluation unit.

7. An apparatus according to claim 6, wherein the path differences $(s_{I,1} \ldots x_{I,N})$ of said receiving interferometers are staggered in N equal intervals $\Delta x_I$ and are varied in a systematic way, each one by at least $\Delta x_I$, so as to completely cover that range of variation of $x_I$ which is required for the detection of the extreme values of the interference, and further wherein each said evaluation unit evaluates the output light-fluxes sequentially in a time-multiplex operation.

8. A method for the measurement of quantity of length or displacement characterized in that said quantity is represented by a path difference of two partial light beams passing through the two arms of a two-beam interferometer, said two partial light beams being produced by splitting a primary light-flux and being recombined by superposition, resulting in an interference effect which is evaluated for said path difference and is further evaluated for said length or displacement to be measured, said primary light-flux originating from a broadband optical source, i.e. light whose spectral width is comparable with a mean wavelength of said source, and being coupled into a system of interferometers, containing at least two interferometers which are interconnected in a manner so that a first output light-flux results at the output of one of said interferometers by the recombination of two partial light beams produced by splitting said primary light-flux is sent to a detector, and one of said interferometers being arranged so that is path difference $x_{II}$ is proportional to the quantity to be measured, and employing a systematic variation of the path difference $x_I$ of the partial light beams in said other interferometer serving as the receiver, said variation leading to the detection of an extreme value of the correlation signal produced by said detector, said extreme value identifying the condition of equality of said path differences $x_I$ and $x_{II}$ in said interferometers, and said path difference $x_I$ existing at detection of said condition being evaluated in terms of the quantity to be measured, said method being further characterized in that an optical fiber is used to provide the optical interconnection of the two interferometers, one of which interferometers is arranged at a location where the quantity to be measured is transduced into a path difference of the interferometer arms of said interferometer, while the other interferometer, serving as the receiver, is situated near a location of evaluation, characterized in that said path difference $x_I$ in the receiving interferometer is dithered periodically with an amplitude which is smaller than half the width of the correlation function of said primary light-flux, with the duration of one period of said dither modulation being short compared to the time interval during which the length to be measured may change by an amount corresponding to the amplitude of said dither modulation, and further characterized in that an error signal is generated by phase-sensitive detection of an AC part of the output signal of said detector, employing the dither frequency as the reference signal, and said error signal controlling a mechanism which increases or reduces said path difference $x_I$ in said receiving interferometer in such a manner, depending upon the polarity of the error signal, that said path difference $x_I$ is maintained closely equal to said path difference $x_{II}$ in said first interferometer proportional to the quantity to be measured.

9. A method according to claim 8, characterized in that said systematic variation of said path difference $x_J$, employed in said interferometer serving as the receiver, is performed linearly with time with a velocity of constant absolute value, but of periodically alternating direction, and that the quantity to be measured is evaluated from the difference of those times at which the output signal of said detector assumes its extreme values.

* * * * *